United States Patent [19]
Reiss

[11] 4,403,023
[45] Sep. 6, 1983

[54] THERMAL INSULATION

[75] Inventor: Harald Reiss, Leimen, Fed. Rep. of Germany

[73] Assignee: Brown, Boveri & Cie AG, Mannheim, Fed. Rep. of Germany

[21] Appl. No.: 309,068

[22] Filed: Oct. 6, 1981

[30] Foreign Application Priority Data

Oct. 9, 1980 [DE] Fed. Rep. of Germany ....... 3038142

[51] Int. Cl.³ .......................................... H01M 10/50
[52] U.S. Cl. .................................... 429/120; 429/101; 220/3.1
[58] Field of Search ............................... 429/101–104, 429/120, 26; 220/3.1, 421, 429

[56] References Cited

U.S. PATENT DOCUMENTS

| | | | |
|---|---|---|---|
| 3,424,622 | 1/1969 | Dechert | 429/120 X |
| 3,837,918 | 9/1974 | Nakabayashi | 429/120 X |
| 4,230,780 | 10/1980 | Jacquelin | 429/104 |
| 4,235,956 | 11/1980 | Gross et al. | 429/120 X |

*Primary Examiner*—Charles F. LeFevour
*Attorney, Agent, or Firm*—Herbert L. Lerner; Laurence A. Greenberg

[57] ABSTRACT

Thermal insulation with at least one closed-off cavity which contains insulating material, and which cavity has at most a residual pressure of 1 to 10 mbar and is completely filled with at least one-fine grain powdered insulating material with high porosity.

10 Claims, 3 Drawing Figures

THERMAL INSULATION

BACKGROUND OF THE INVENTION

1. Field of the Invention

The invention relates to thermal insulation with at least one closed-off cavity which contains an insulating material.

2. Description of the Prior Art

Such thermal insulations find application in preventing heat losses, especially in power engineering. They are intended particularly for devices such as batteries of the alkali metal and chalcogen type which are usually surrounded by heat insulation in order to prevent the storage cells from cooling down particularly in the pauses of the operation.

Thermal insulation for such batteries is already known. This insulation is substantially formed by an evacuated cavity, within which metal foil is arranged. This metal foil is especially made of aluminum or alloy steel and arranged at a predetermined mutual spacing. The cavity is defined by metallic walls. In order to avoid buckling of these defining walls (due to the vacuum present), the cavity is equipped with additional braces. For this purpose, rod-shaped supports can be considered which are arranged in the interior of the cavity between defining walls which extend parallel to each other. Stiffening of the outer walls, of course, is also conceivable. In the case of cylindrical defining walls of the cavity, such bracings are not necessary. The above-mentioned support elements, especially the rod-shaped braces, cause an additional heat flow from the interior of the insulation toward the outside. Thereby, the low thermal conductivity achieved by the metallic foil is to a considerable extent lost again.

SUMMARY OF THE INVENTION

It is, therefore, an object of the invention to provide thermal insulation of the type mentioned at the outset which has a lower thermal conductivity than the insulations known to date, and the dimensions and structural volume of which are kept very small. The thermal insulation should, furthermore, be designed so that support elements in the cavity of the insulation and additional stiffeners of the outer walls may be dispensed with.

With the foregoing and other objects in view, there is provided in accordance with the invention a thermal insulation comprising at least one closed-off cavity containing insulating material with said cavity having at most a residual pressure of 1 to 10 mbar and filled with at least one fine-grain powdered insulating material with high porosity.

Other features which are considered as characteristic for the invention are set forth in the appended claims.

Although the invention is illustrated and described herein as embodied in thermal insulation, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
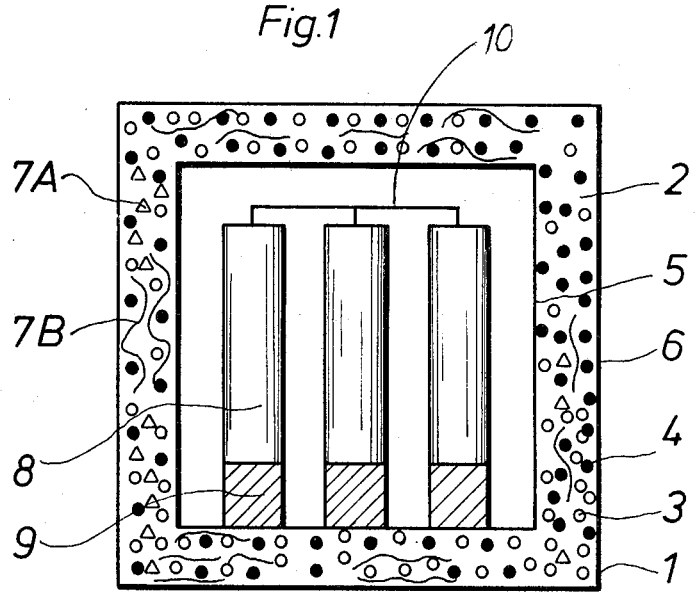
FIG. 1 diagrammatically shows a vertical section through an electrochemical battery with thermal insulation, in accordance with the invention, and in particular shows a cavity containing a first and second optical opacifier as well as highly dispersed silica and also fibers.

In accordance with the invention, the thermal insulation has a gas pressure of at most 1 to 10 mbar and is completely filled at least with one fine-grain, powdered insulating material with high porosity.

The cavity forming the thermal insulation is completely filled out with at least two powdered infrared-optical opacifiers which are mixed with each other. In particular, a first opacifier is used for this purpose which has a primary particle size of at most 0.01 to 0.03 $\mu$m and exhibits a high index of refraction in the infrared region. The powdered mixture filled into the cavity further comprises a second infrared-optical opacifier which has a primary particle diameter of at most 0.2 to 0.5 $\mu$m. The second opacifier has advantageously a needle-shaped crystal structure. In particular, the longitudinal axes of the needle-shaped crystals are arranged perpendicularly to the direction of the temperature gradients. The second opacifier is advantageously a ferro-magnetic material. Titanium oxide is preferably of interest as the first opacifier, while magnetite ($Fe_3O_4$) is used as the second opacifier. The two optical opacifiers can be filled into the cavity as insulating material in mixing ratios between 1:2 and 10:1 parts by weight titanium oxide and magnetite. In particular, the mixture comprising the two opacifiers is filled into the cavity with a high porosity. Lower porosity of the mixture means high density, which in turn means high solid-body conductivity of the mixture, while with excessively high porosity, the powder mixture becomes transparent again in the infrared region. The two opacifiers can be filled into the cavity, for instance, in a mixing ratio of 1:1 and a density of $\rho \leq 0.48$ g/cm$^3$. A mixing ratio of two parts by weight titanium oxide and one part by weight iron oxide with a density of $\rho \leq 0.36$ g/cm$^3$ is also possible. The two opacifiers can be mixed together at the filling or at an earlier time. With a residual gas pressure of at most 1 to 10 mbar within the cavity, a thermalconductivity $\lambda \leq 5 \times 10^{-3}$ W/(m×K) is obtained at a temperature of 300° C. if one of the above-mentioned mixing ratios is applied.

By filling the cavity with the two mixed opacifiers, the metallic defining walls thereof are given sufficient support. In any case, the powdered mixture comprising the two opacifiers are filled into the cavity with such a porosity that the metallic defining walls are not bent inward at a very low gas pressure, p=0.1 mbar. If the situation requires, the powdered mixture comprising the two opacifiers can be arranged at least in some regions with a lower porosity within the cavity for better support of the defining walls. A slight increase of the solid-body conductivity must then be tolerated in these regions. The heat retardation of the insulation overall, however, is not impaired thereby. According to the invention, the pressure-proofness, i.e. resistance to pressure, of the insulation can also be increased if about 50 to 80% by weight highly dispersed silica are added to the mixture comprising the two opacifiers, for instance, silicon aerogels, and for increasing the bending strength, 5 to 10% by weight micro fibers. Through this measure according to the invention, the solid-body conductivity is not significantly increased. The fibers which are added to the two opacifiers mixed with each other, are in particular glass or ceramic fibers. The fibers are arranged, as are the crystal needles of the magnetite, perpendicularly to the direction of the temperature gradients within the cavity. The fibers used have a diameter of $\leq 15$ $\mu$m and a length of not more than 5 to 10 mm.

The thermal insulation can advantageously be used not only for the thermal insulation of devices which have a temperature between 300° and 600° C., but the thermal insulation may also be applied in the high-temperature range. In particular, the insulation can be considered, for instance, as thermal insulation for piping networks which are provided for the transport of flowing media. The thermal insulation is in particular employed for temperatures of 800° C. and more. It is intended particularly for the thermal insulation of piping systems which extend over several kilometers.

According to the invention, the cavity forming the insulation is preferably filled with two opacifiers mixed together, which exhibit a high index of refraction in the infrared range and are, therefore, particularly suitable for radiation extinction. By the addition of magnetite to the titanium oxide, the radiation extinction is enhanced. Thereby, the $T^3$-dependence of the radiation conductivity can be reduced better than with pure titanium oxide alone. As already mentioned, magnetite especially is used as the second opacifier, since it has in part a needle-shaped crystal structure. According to the invention, these needle-shaped crystals are arranged, when being filled into the cavity, with the aid of an externally applied magnetic field in such manner that their longitudinal axes are oriented perpendicularly to the direction of the temperature gradients. The orientation of the crystal needles of the magnetite is then fixed by densifying the powder mixture, for instance, by vibrating or compressing, to prevent or retard another orientation of the needles. Through this measure, the suppression of the radiation conduction and solid-body (bulk) conduction is promoted. The orientation of the needle-shaped crystals of the $Fe_3O_4$ in the above-mentioned direction causes a reduction of the solid-body conductivity, since the heat flow is directed in the direction of the longer axes of the crystal needles. The radiation conductivity is further reduced thereby due to the increased scattering cross sections.

According to the invention, the $Fe_3O_4$ filled into the cavity is additionally used for developing the vacuum in the cavity. In particular, use is made here of the fact that this iron oxide $Fe_3O_4$ is also present in the form $FeO \times Fe_2O_3$. If this material is heated, oxygen is absorbed by the FeO, and the latter is converted into a higher oxidation stage, especially into $Fe_2O_3$. By binding the oxygen to the iron oxide, the partial pressure of the oxygen present in the cavity is additionally reduced.

The invention will be explained in the following with the aid of the drawings.

FIG. 1 shows the thermal insulation 1, arranged around an electrochemical storage battery. The thermal insulation is is formed by a gastight cavity 2 which is completely filled with a mixture in powder form which comprises two optical opacifiers 3 and 4. In the embodiment example described here, the hermetically sealed cavity 2 is formed by two prismatic hollow metallic bodies 5 and 6. The two cavities 5 and 6 have different side lengths, the smaller body 5 being arranged concentrically within the larger body. The boundary surfaces of the prismatic bodies 5 and 6 are made of alloy steel. The dimensions of the smaller prismatic body 5 are chosen so that the cavity 2 arranged between the two bodies 5 and 6 has the dimensions necessary therefore. In particular, the width of this cavity depends on the desired thickness of the thermal insulation 1. The metallic boundary surfaces of the two prismatic bodies 5 and 6 are connected to each other gastight, and the preferred method of connecting the boundary surfaces is to weld them together, which generally assures that the cavity 2 between the boundary surfaces is sealed gastight. Before the cavity 2 is finally sealed gastight, it is filled with the mixture in powder form, containing the two optical opacifiers 3 and 4. According to the invention, titanium oxide is used for this purpose as the first opacifier 3 and $Fe_3O_4$ as the second opacifier 4. In the example described here, the two infrared-optical opacifiers 3 and 4 are filled into the cavity in a mixing ratio 1:1. Preferably, the porosity of the filled-in mixture in powder form has a value $\pi$ which is between 0.89 and 0.95. Within the cavity 2, a gas pressure is desired which has at most a value of 1 to mbar, preferably, a residual gas pressure p=0.1 mbar. To increase the mechanical strength, especially the carrying capacity of the thermal insulation, an addition of highly dispersed silica 7A and fibers 7B is mixed with the two optical opacifiers 3 and 4. In the embodiment example described here, the weight contents of the highly dispersed silica is about 50 to 80%, and the weight contents of the fibers is about 5 to 10%. The powdered mixture comprising the two optical opacifiers 3 and 4 is preferably doped with glass or ceramic fibers 7B. Silicon aerogels are added as highly dispersed silica. The fibers 7B used here are filled into the cavity 2 in such a manner that the direction of their extent is arranged perpendicularly to the direction of the temperature gradients. The diameter of the fibers used here is smaller than 15 $\mu$m. The fibers 7B are not longer than 5 to 10 mm. The thermal insulation shown in FIG. 1 and described here has, at 300° C., only a thermal conductivity $\leq 5 \times 10^{-3}$ W/(m$\times$K).

As already mentioned at the outset, the thermal insulation is arranged around an electrochemical storage battery which is constructed from one or more storage cells 8 of the sodium and sulfur type. The storage cells 8 are arranged in the interior of the prismatic cavity 5. In the embodiment example shown in FIG. 1, they are depicted only schematically. The storage cells 8 are supported on an inner boundary wall of the prismatic cavity 5 with the interposition of electrically conducting structural elements 9. The latter serve for the electrical connection of the outer jackets of the storage cells 8, which form one electrical pole of the storage cells. The second electrical poles of the storage cells 8, which are located at the upper ends thereof, are connected together via an electric line 10. The latter is electrically insulated (not shown here) and is brought to the outside.

As already mentioned above, powdered $Fe_3O_4$ is filled into the cavity 2 as the second opacifier 4. Magnetite has a needle-shaped crystal structure. According to the invention, these needle-shaped crystals are oriented, when being filled into the cavity 2 by applying an external magnetic field, such that the longitudinal axes of their needles are oriented perpendicularly to the temperature gradients. The preferred titanium oxide is titanium dioxide ($TiO_2$).

Figure 2:
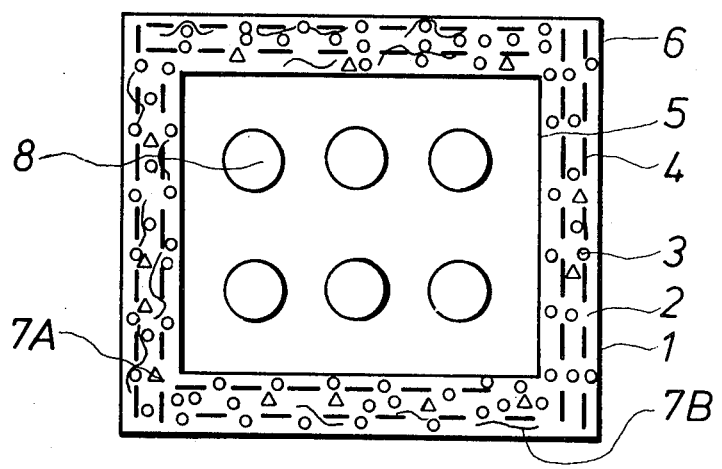
FIG. 2 is a horizontal section through the storage battery shown in FIG. 1.

FIG. 2 shows a horizontal section through the storage battery shown in FIG. 1. It can clearly be seen from this drawing that the needle-shaped iron oxide crystals are oriented perpendicularly to the direction of the temperature gradient. In this example, the two opacifiers 3 and 4 are filled into the cavity 2 in a mixing ratio of 1:1 and with a density $\rho \leq 0.48$ g/cm$^3$.

Figure 3:
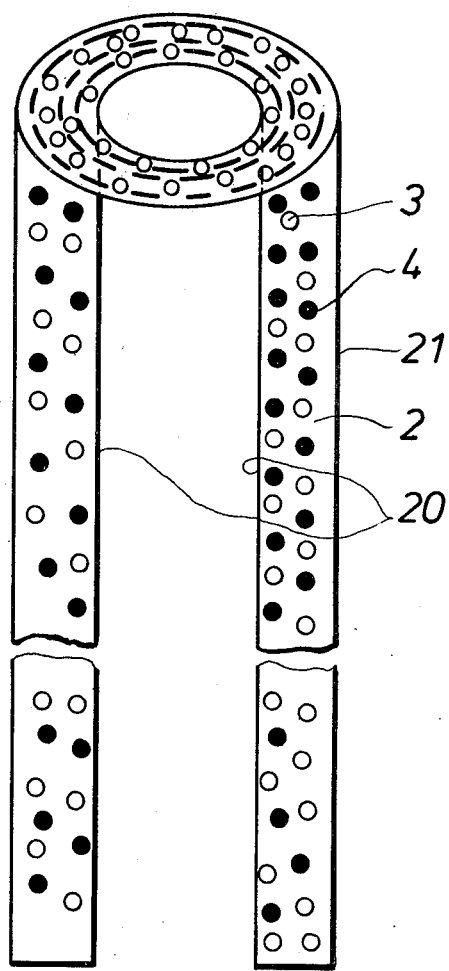
FIG. 3 illustrates a pipeline provided for hot flowing materials covered with the thermal insulation according to the invention.

FIG. 3 shows a further embodiment of the thermal insulation 1. In particular, the thermal insulation 1 is arranged there about a piping system 20, inside which hot flowing media such as gases are transported. FIG. 3 shows only a limited section of this piping system 20. The thermal insulation 1 is formed here also by a cavity 2 which is hermetically sealed to the outside. The boundary walls of this cavity are formed by two tubes 20 and 21 which have different diameters. In particular, the tube 20 provided with the smaller diameter is arranged concentrically inside the tube 21. This creates a uniform space between the two tubes 20 and 21, which serves as the cavity 2 for the thermal insulation 1. At the ends of these two tubes 20 and 21, the cavity is closed off gastight by metallic washers. The interior of the cavity 2 is again filled with two mixed-together opacifiers 3 and 4. Iron oxide, especially $Fe_3O_4$, is used as the first opacifier. The needle-shaped crystals of the magnetite are oriented and fixed also here, according to the invention, in such manner that they are arranged permanently perpendicularly to the direction of the temperature gradient. The hermetically sealed cavity filled with the two opacifiers 3 and 4 is evacuated so that it has a residual gas pressure of 1 to 10 mbar.

I claim:

1. Thermal insulation comprising at least one cavity containing insulating material closed off by walls, with said cavity having at most a residual pressure of 1–10 mbar and containing a first and a second powdered infrared optical opacifiers wherein the first opacifier is titanium dioxide and the second is magnetite, said first opacifier having a primary particle diameter of at most 0.01 to 0.03 μm and the second opacifier having a primary particle diameter of at least 0.2 μm and both opacifiers having a high index of refraction in the infrared range.

2. Thermal insulation according to claim 1, wherein 50–80% by weight of highly dispersed silica is admixed with the two opacifiers.

3. Thermal insulation according to claim 2, wherein the silica is silicon aerogels.

4. Thermal insulation according to claim 1, wherein the second opacifier has a needle-shaped crystal structure and the longitudinal axes of the needle-shaped crystals of the second opacifier are arranged perpendicularly to the direction of the temperature gradients.

5. Thermal insulation according to claim 1, wherein glass or ceramic fibers are admixed with the infrared-optical opacifiers.

6. Thermal insulation according to claim 5, wherein the glass or ceramic fibers have a diameter of 15 μm and a length of 5–10 mm.

7. Thermal insulation according to claim 1, wherein the walls of the cavity are metallic and have little thermal expansion.

8. Thermal insulation according to claim 1, wherein the walls of the cavity are made of alloy steel.

9. Thermal insulation according to claim 1, wherein said residual pressure in the cavity is in part obtained by conversion of FeO into $Fe_2O_3$.

10. Thermal insulation according to claim 1, wherein the cavity is bounded in part by the outside surface of a smaller hollow body disposed within a larger hollow body with said outside surface spaced from the inner surface of the larger body which also bounds a part of the cavity, and the space between said inner surface and said outer surface forming the cavity.

* * * * *